Nov. 19, 1963  O. F. SCHAPER  3,111,615
LINE FOLLOWING SERVOSYSTEM
Filed Aug. 29, 1960  3 Sheets-Sheet 1

INVENTOR.
OTTO F. SCHAPER
BY
Lawrence S. Epstein
ATTORNEY

INVENTOR.
OTTO F. SCHAPER
BY
Lawrence S. Epstein
ATTORNEY

Nov. 19, 1963     O. F. SCHAPER     3,111,615
LINE FOLLOWING SERVOSYSTEM

Filed Aug. 29, 1960     3 Sheets-Sheet 3

INVENTOR.
OTTO F. SCHAPER
BY
Lawrence S. Epstein
ATTORNEY

United States Patent Office 3,111,615
Patented Nov. 19, 1963

3,111,615
LINE FOLLOWING SERVOSYSTEM
Otto F. Schaper, 16 Norwood Road,
Port Washington, N.Y.
Filed Aug. 29, 1960, Ser. No. 52,750
4 Claims. (Cl. 318—31)
(Granted under Title 35, U.S. Code (1952), sec. 266)

The invention described herein may be manufactured and used by or for the Government of the United States of America for governmental purposes without the payment of any royalties thereon or therefor.

This invention relates to function generating devices and is particularly directed towards a device which provides a particular electrical function in terms of a mechanical output. Specifically, the instant invention is a programming device which provides a mechanical shaft rotary displacement as a function of time.

Such a device finds useful application in connection with simulators and training devices of all types and more specifically simulating and training devices for airborne tracking devices.

In principle, the device includes a particular function inscribed upon a rotating disk. A moving pick-off which moves in relation to the rotating disk centers the position of electrical function on the disk. Electrical variations are generated in the electrical pick-off and feedback circuitry is utilized to maintain the electrical pick-off centered in relation to the electrical function inscribed on the disk. The position of the pick-off arm with relation to the rotating disk is then utilized for the output representing the particular electrical function.

Accordingly, it is an object of the invention to provide an improved device for the generation of a particular function.

It is a further object of the instant invention to provide an improved device for the generation of an electrical function.

It is another object of the invention to provide an improved device for the generation of a particular electrical function and the provision of a mechanical output in accordance with this electrical function.

A further object of the instant invention is to provide an improved device for the generation of an electrical function, said device being small in size, having high repetitive accuracy, having ease of maintenance, low cost and relatively high output torque.

Figure 1:
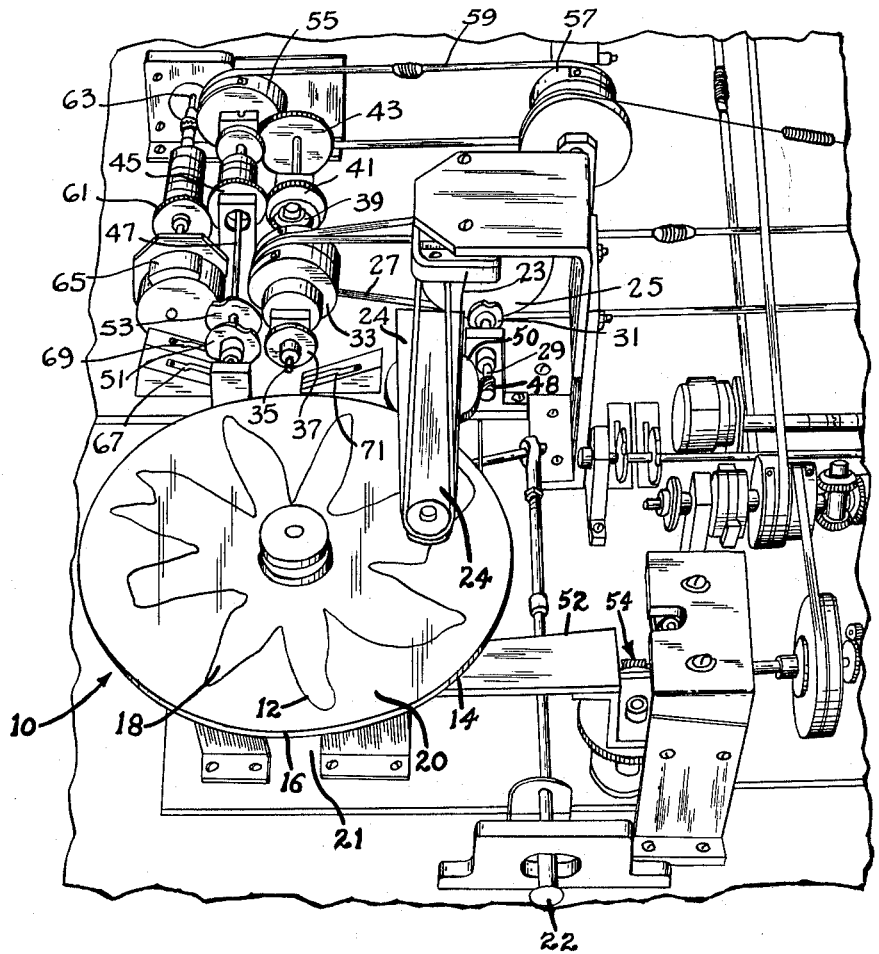
Figure 2:
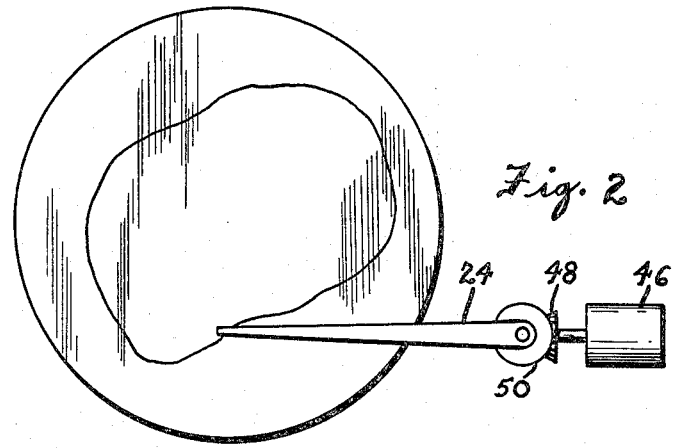
Figure 3:
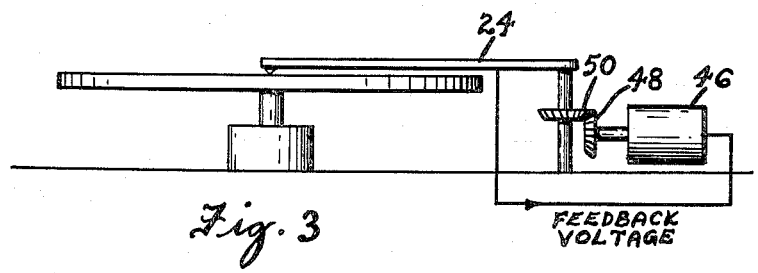
Figure 4:
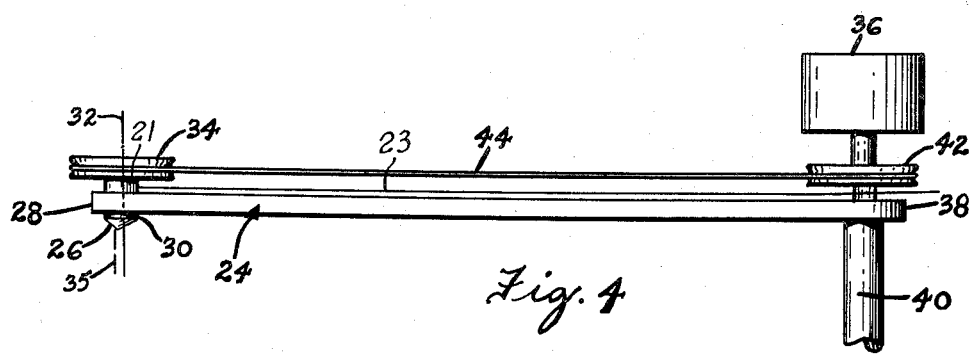
Figure 5:
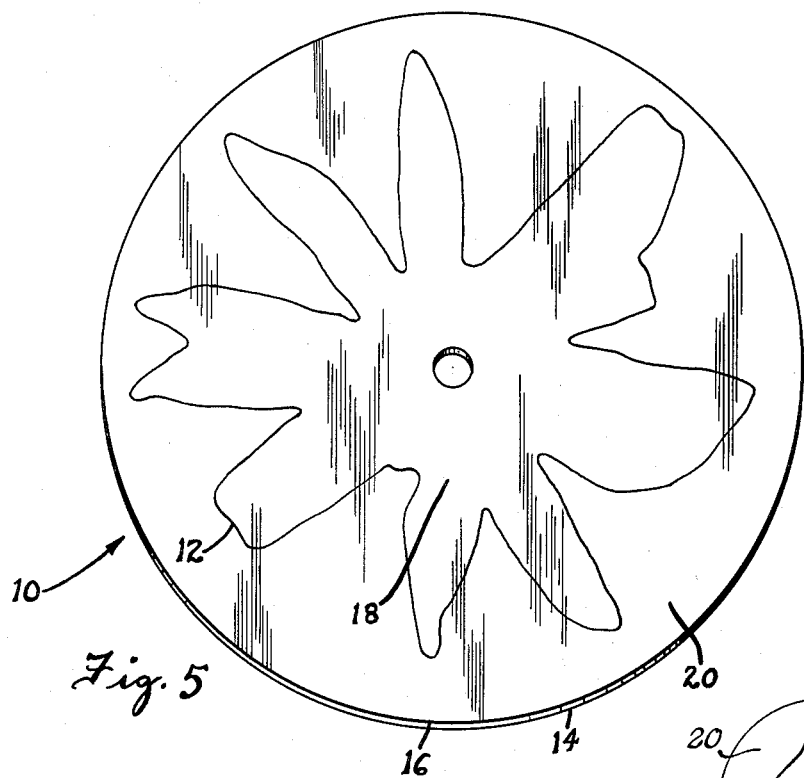
Figure 6:
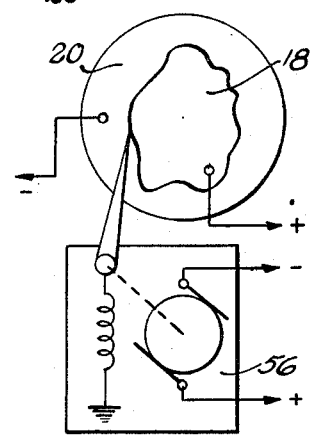
Figures 7, 8:
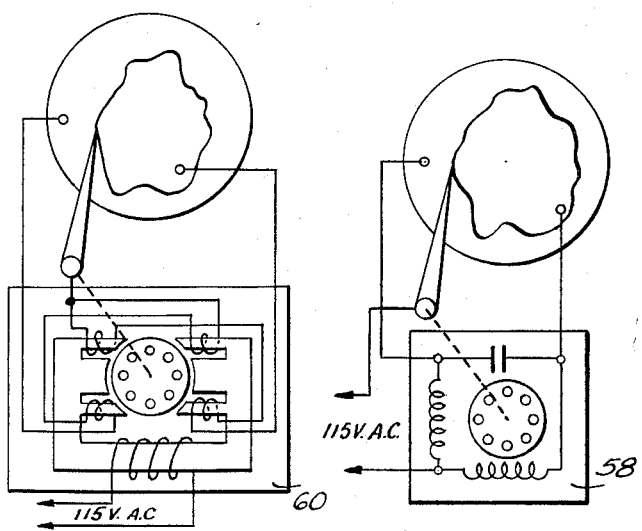

Other objects and many of the attendant advantages of this invention will be readily appreciated as the same becomes better understood by reference to the following detailed description when considered in connection with the accompanying drawings wherein:

FIG. 1 is a pictorial view of the essential mechanical elements of the invention;
FIG. 2 is a top view of the cam mounting;
FIG. 3 is a side view of the cam mounting;
FIG. 4 is a detailed view of the follower arm and stylus;
FIG. 5 is a detailed view of the function inscribed on the rotating disk; and
FIGS. 6, 7 and 8 are different embodiments of the control circuitry for controlling the function follower.

Referring now to FIG. 1, the wheel disk 10 has the specific function 12 engraved on it. The wheel base comprises an insulating material 14 with its upper surface copper clad 16. The function 12 engraved in the top copper surface is engraved to the depth of the insulating material whereby the inner portion of copper within the inscribed function 18 is electrically separated from the external portion of the copper 20 by an air dielectric. Disk 10 is rotated by a motor which is located underneath the disk. The motor is of the variable speed type and its action is controlled by clutch lever 22. When clutch lever 22 is pushed in, the motor 21 (not shown) is engaged to the disk 10 and the disk will rotate in the direction and at the speed as dictated by the motor control circuit. The pick-up arm 24 has a pick-up point 26 rotatably mounted at its end 28. The pick-up point 26 is bearing mounted in arm 24 by means of bearing 30. This pick-up point 26 is mounted eccentric with respect to the center point of rotation 32. The mounted eccentricity marked 35 in FIG. 4 is slightly greater than the width of the engraved line 12. Pulley 34 mounted above pick-off point 26 is used to rotate pick-up 26. Motor 36 which is mounted over the end 38 of the follower arm 24 rotates on pivot shaft 40 and has pulley 42 mounted on its shaft. Belt 44 which is in tension about pulleys 42 and 34 is used to drive the eccentric pick-up stylus 26. Thus, when rotated by motor 36, the pick-up stylus will continuously make contact with both copper clad surface 18, and copper clad surface 20, if center 32 of the pick-up stylus is located directly over the center of the engraved line 12. If a positive voltage is placed on the copper surface 20 and a negative voltage is placed on the copper surface 18, then the voltage on arm 24 with the center of rotation of stylus 26 directly over the center line of the engraved line 12 is zero for all practical purposes. However, if the center 32 of the stylus 26 deviates slightly from the center, there will be a positive or negative voltage on follower arm 24 depending upon the direction of deviation from center. This voltage is applied to the driving motor 46 to control the travel of follower arm 24 in such a direction so as to reorient the follower arm and the center stylus 32 over the center of the engraved line 12. The movement of motor 46 is transmitted through gears 48 and 50. The operation of the follower arm and the associated output mechanical and electrical circuits which provide the function 12 inscribed on the disc 10 in the form of output electrical signals and mechanical positions is as follows: The eccentric metallic point 26, which rotates due to drive motor 36 through pulleys 42 and 34 and pulley drive belt 44, is electrically connected by means of a wiper arm 21 and wire 23 to the input of motor 25. Motor 25 is represented schematically as one of three different motors, namely 56, 58 and 60. This motor is reversible and will rotate in a direction which depends upon whether its input voltage from wire 23, which contacts bearing 26, is positive or negative. Motor 25 turns shaft 29 to rotate helical bevel gear 48 which meshes with bevel gear 50 which is attached to tracking arm 24. Motion of motor 25 therefore turns tracking means 24 in the direction to maintain this position on the function 12. Motor 25 also drives flywheel 33 by means of drive belt 27. Flywheel 33 is mounted on shaft 35 which also has mounted on it cam 37, differential 39, gear 41 and gear 43. Gear 41 drives gear 45 which is mounted on shaft 47. Also mounted on shaft 47 are cams 51 and 53, gear 45 and flywheel 55. Flywheel 55 drives flywheel 57 by means of belt 59 thereby providing a mechanical rotating output which is proportional in direction and speed to the function inscribed upon function 12. The proportion is determined by the ratio of flywheel 33 to the flywheel on motor 25 and the ratio of gears 41 and 45. Gear 41 drives gear 45 which in turn drives gear 61. Gear 61 is mounted on shaft 63. Also mounted on shaft 63 is synchro transmitter 65. Synchro transmitter 65 provides electrical outputs which are proportional to the function 12. Cams 51, 53 and 37 respectively rotate against relays 67, 69 and 71. These relays provide electrical output signals at certain portions of the rotation of cams 51, 53 and 37, depending upon the contour of the cam. Thus it is seen that both electrical and mechanical outputs are provided which are proportional to the function 12 inscribed on the top surface of plate 10 with respect to time. The underside of plate 10 also has a function inscribed thereon and the associated mechanical and electrical outputs are identical in construction to the outputs from the top surface. Thus, the follower arm will follow the engraved line 12 very closely and the movement of the follower arm represents the function inscribed on the disk 10. This movement is transmitted in the form of a torque to drive any required electric or mechanical circuits.

The motion of the eccentric pick-off 26 is relatively rapid compared to the speed of the wheel disk 10 and the speed of the follower arm 24. As the disk 10 turns and the follower arm 24 begins to deviate from the center of the engraved pattern, the amount of driving signal supplied to the motor 46 to correct the follower arm position will depend upon the amount that the center of the pick up stylus is offset from the center line of the engraved function. On the center line of the pattern the signal to motor 46 is practically zero due to the fact that the contact is on both sides of the line for equal increments of time and the average affect is a null. When the position of the follower arm is corrected, positive breaking action of motor 46 is provided by the rapid switching of direction of the motor travel. Due to the fact that single phase industrial motors and two-phased induction motors which are well known in the art are used no further description of the type of motor is made here.

A further advantage of the instant device is the facility with which change or modifications of the pattern engraved on the disk 10 may be made. Changes are effected by filling in the obsolete portion of the curve with solder and engraving a new line as desired.

In cases where two disks with the same time base are required and space is limited, it is simple to utilize both sides of the disk for separate engraved functions. If both sides of the disk 10 are to be utilized, both sides must be copper clad and a separate follower arm and drive are required. Such a separate follower arm and drive are respectively shown at 52 and 54 in FIG. 1.

FIGS. 6, 7 and 8 respectively show three different orientation means for orienting the eccentric pick-up in relation to the function engraved on the disk 10. FIG. 6 shows the source of potential as D.C. with the positive potential being applied to the inner portion 18 and the negative potential being applied to the outer portion 20 and the means for orienting the pick-up stylus as a D.C. motor 56. FIG. 7 shows the source of potential as 115 volts A.C. with the means for orienting the pick-up stylus as a two-phased induction motor 58. FIG. 8 shows the source of potential as 115 volts A.C. with the means for orienting the pick-up stylus as a single-phase shaded pole induction motor 60.

Obviously many modifications and variations of the present invention are possible in the light of the above teachings. It is therefore to be understood that within the scope of the appended claims the invention may be practiced otherwise than as specifically described.

What I claim is:

1. An electromechanical function generator comprising a disk of insulating material having a first and a second electrically conducting surface, each of said surfaces being respectively divided into inner and outer portions by a first and a second insulating element, each of insulating elements providing closed loops, means to rotate said disk, a first and a second eccentric rotatable stylus respectively coupled to the upper and lower surfaces of said disk, rotating means driving said stylii, a source of potential operatively connected to each of said inner and outer electrically conducting portions of said conducting surfaces, output means operatively connected to said stylii for generation of functions in accordance with the shape of said insulating elements dividing said inner and outer portions of said electrically conducting surfaces, and first and second orientation means respectively coupled to said first and second eccentric rotatable stylii to maintain said stylii respectively upon said first and second insulating elements.

2. The combination of claim 1 wherein said orientation means comprises a D.C. motor.

3. The combination of claim 1 wherein said sources of potential are respectively two different phases of 115 volts and said orientation means comprises a two-phase induction motor.

4. The combination of claim 1 wherein said induction means comprise two different phases of 115 volts A.C. and said orientation means comprise a single-phase shaded pole induction motor.

References Cited in the file of this patent

UNITED STATES PATENTS

| | | |
|---|---|---|
| Re. 23,275 | Field | Oct. 3, 1950 |
| 2,343,116 | Ryder et al. | Feb. 29, 1944 |
| 2,354,391 | McCourt | July 25, 1944 |
| 2,410,550 | Padva | Nov. 5, 1946 |
| 2,499,178 | Berry et al. | Feb. 28, 1950 |
| 2,588,386 | Hubbard et al. | Mar. 11, 1952 |
| 2,611,115 | Johnston | Sept. 16, 1952 |
| 2,627,594 | Sawyer et al. | Feb. 3, 1953 |
| 2,744,224 | Bode | May 1, 1956 |
| 2,875,389 | Morrill | Feb. 24, 1959 |
| 2,939,321 | Shovic | June 7, 1960 |
| 2,941,135 | Anderson | June 14, 1960 |
| 3,051,882 | Stoudenmire | Aug. 28, 1962 |